B. Steinmetz,
Bag Lock.
No. 3,765. Reissued Dec. 14, 1869
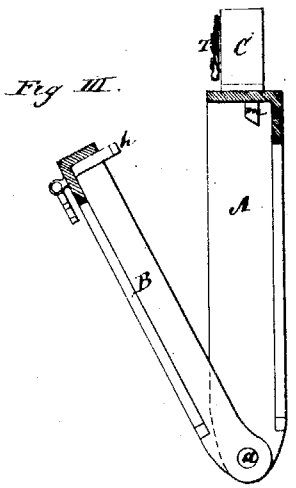
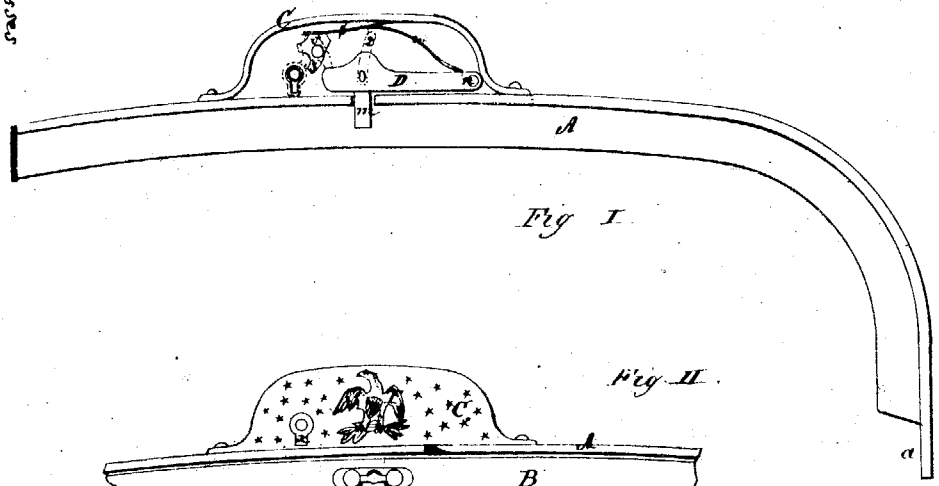
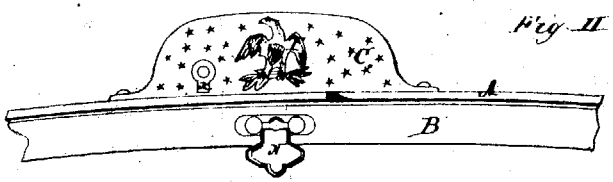
Witnesses
Henry Morse
Louis Stumm
Inventor.
Bernard Steinmetz
per Henry E. Roder
his attorney
N. PETERS, PHOTO-LITHOGRAPHER, WASHINGTON, D. C.

United States Patent Office.

BERNARD STEINMETZ, OF PARIS, FRANCE.

*Letters Patent No.* 49,207, *dated August* 1, 1865; *reissue No.* 3,765, *dated December* 14, 1869.

IMPROVED CARPET-BAG-LOCK.

The Schedule referred to in these Letters Patent and making part of the same.

*To all whom it may concern:*

Be it known that I, BERNARD STEINMETZ, of the city of Paris, in the Empire of France, have invented a new and improved Spring-Lock for Satchels, Carpet-Bags, &c.; and I do hereby declare that the following is a full and exact description of the same, reference being had to the accompanying drawings, and to the letters of reference marked thereon.

Figure I represents a frame for a satchel, with the spring-lock in section.

Figure II is anoutside view of the lock, and of part of the frame.

Figure III shows a section of the frame, open, taken near the lock.

Similar letters represent similar parts.

In the accompanying drawings—

A represents one part of the jaw-frame, to which the lock C is attached, and B is the other part of said frame, bent in any desired form, and jointed together at their lower ends, at *a a*, in the usual manner.

In the lock-case a lever, D, is arranged, turning on a fixed centre, *n*, fast in the said casing, and acted upon by a spring, *w*, so as to press said lever downward.

A projection, *m*, is attached to this lever D, passing through the frame A, and sufficiently long to pass through the staple *h* attached to the inside of the frame B.

On the outside of the lock-casing C, some projecting part or figure T, an eagle, as represented in the drawing, (see Fig. II,) is arranged and attached to this lever D, by means of a bolt or pin passing through a suitable slot, 2, in the side of the casing, by which arrangement the lever D can be forced upward, against the action of the spring *w*, so as to bring the projection *m* clear of the staple *h*, for the purpose of opening the frame A B, and consequently the bag or satchel.

The lower end of the projection *m*, on the side next to the frame B, or to the staple *h*, is made slanting, so as to allow the staple *h* to force said lever D upward, when pressed against said projection *m*, when the satchel requires to be shut or closed, until the staple *h* has passed the projection, when the action of the spring *w* will again force said lever D downward, and into the opening in the staple, and thereby keep the satchel-jaws or frame, &c., closed.

Near the end of the lever D, a tumbling-bolt, *v*, is arranged, turning on a fixed centre, and acted upon by a spring, *s*. This bolt *v* is operated by means of a key inserted through the key-hole *x*, in such a manner as to bring one of its projections, 3, over the end of the lever D, and in which position the action of the spring *s* will hold the same, thereby locking the lever D, and consequently the bag or satchel, until the action of the key removes again this projection on the tumbling-bolt from the end of said lever, and thereby unlocks the same.

N is a small ornamental knob or projection, attached to the frame B, to be taken hold of when the bag or satchel requires to be pulled open.

I have represented the figure of an "eagle" as a shield-knob, and use that form, and therefore prefer to give it that name; but any equivalent device or form, which covers the slot, may be used in its stead, and the eagle may be used on other lock-devices, of different construction, without infringing my invention.

What I claim as my invention, and desire to secure by Letters Patent, is—

The pivoted spring-lever D, with its catch-projection *m*, and the spring tumbling-block or bolt *v*, operated by a key, combined and arranged substantially as herein described, when applied to the jaws of a satchel, bag, or portmanteau, for the purpose specified.

Also, the combination of the "eagle," or shield-knob T, constructed so as to cover the slot 2 in the lock-case C, the catch *m* of the spring-bar D, and the staple *h* of the jaw-frame B, as herein specified.

BERNARD STEINMETZ.

Witnesses:

JNO. G. NICOLAY,
J. U. ZUST.